Figure 1:
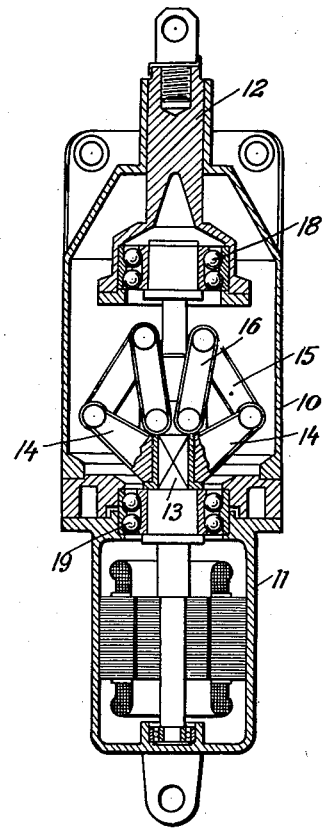

Dec. 18, 1951     H. LANGE     2,579,266

CENTRIFUGAL ACTUATOR

Filed Oct. 12, 1949

Inventor
Heinrich Lange
By: *[signature]*
Attorney

Patented Dec. 18, 1951

2,579,266

UNITED STATES PATENT OFFICE 2,579,266

CENTRIFUGAL ACTUATOR

Heinrich Lange, Hamburg, Germany

Application October 12, 1949, Serial No. 120,874
In France July 12, 1948

6 Claims. (Cl. 74—25)

1

The present invention relates to a device for producing an actuating impulse such as required for lifting brakes for releasing clutches, or the like. More particularly, the invention relates to an actuating device of such kind operating on the principle of the centrifugal regulator thus comprising an electric motor and fly weights driven by said motor and operating on a linkage adapted to displace a rod transferring the actuating impulse to the brake, the clutch, or other mechanism to be actuated.

Prior actuating devices of this type were equipped with an auxiliary brake adapted to be automatically released, when the electric motor is started, and to be rendered effective upon a de-energization of the electric motor to decellerate and stop the rotary elements as fast as possible thereby restoring the mechanism to be actuated. The provision of such an auxiliary brake was deemed indispensable in order to guarantee a sufficiently prompt response of the actuating device to a de-energization of the electric motor. If the actuating impulse serves the purpose, for instance, of lifting a normally effective brake, a prompt response to the de-energization of the electric motor is required so that the brake will promptly react to any controlling command.

Experience has shown, however, that the auxiliary brake provided to slow down and stop the rotary elements of the actuating device is liable to limit the life and the reliability of the latter, since the auxiliary brake requires service, particularly re-adjustment, to compensate for wear. Even though a careful choice of materials may increase the life to an extent permitting more than a million of actuations without any overhaul, it happens once in a while that the auxiliary brake is subject to premature wear. Therefore, it is an object of the present invention to provide a centrifugal device for generating an actuating impulse in which an auxiliary brake is dispensed with.

It has been proposed prior to the present invention to slow down and to stop the rotary elements of the actuator by producing an electrical braking force; but the means required therefor are comparatively expensive. Thus it has been proposed in the German Patent No. 705,814 to drive the actuating device by a variable speed motor and to reduce the speed thereof down to zero for stopping the device. Variable speed motors, however, are more expensive than standard electric motors operating at a constant speed.

It is a further object of the present invention

2 to provide a device of the centrifugal regulator type for generating an actuating impulse in which an auxiliary brake for the rotary elements thereof is dispensed with and which is driven by a standard constant speed motor.

Further objects of the present invention will appear from the description of a preferred embodiment of the invention following hereinafter and the features of novelty will be pointed out in the claims.

Figure 2:
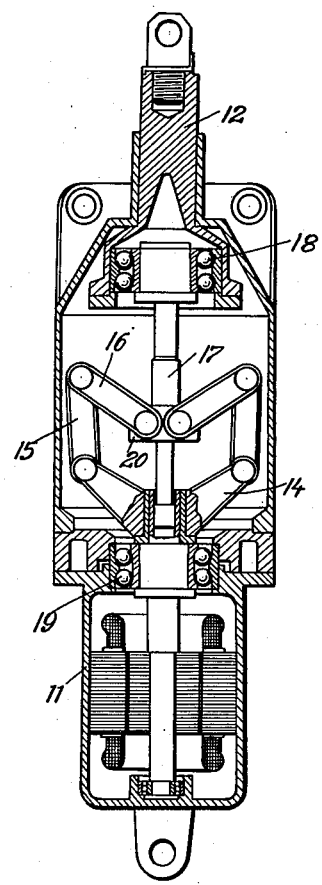

In the accompanying drawing a preferred embodiment of the novel actuating device is illustrated by way of two axial sections, Fig. 1 illustrating the resting position and Fig. 2 the actuated position of the elements of the device.

On the lower end wall of a cylindrical housing 10, there is mounted a standard A. C. induction motor 11 having 3000 R. P. M. whereas in the upper end walls there is slidably mounted an actuating thrust rod 12 extending out of the housing and serving the purpose to lift a normally effective brake or to disengage a clutch or to produce an actuating impulse for similar purposes. The electric motor 11 operates a shaft 13 journaled in the housing by means of an anti-friction bearing 19 and provided with radial arms 14. A member provided between and in axial alignment with the thrust rod 12 and the shaft 13 and constituted in the present embodiment by another shaft 17 is connected with each of the arms 14 by a pair of links 15 and 16 hinged to one another and to the respective arm 14 and to a block integral with the shaft 17.

It will be noted from the drawing that the upper ends of the links 15 are pivotally connected to the upper ends of the links 16 and that the lower ends of the links 15 are pivotally connected to the arms 14 of the shaft 13, whereas the lower ends of the links 16 are pivotally connected to a head 20 of shaft 17. As a result, the upper ends of the links 15 and 16, when the device is at rest, are located radially intermediate the lower ends of both pairs of links. That has the effect of causing the centrifugal force produced by the links to urge the head 20 upwardly as distinguished from certain prior art actuators in which the actuating rod is pulled inwardly by the links.

The upper end of shaft 17 is connected with the thrust rod 12 by an anti-friction thrust bearing 18 for common longitudinal displacement, whereas the lower end of the shaft 17 is slidably mounted in an axial bore of the shaft 13.

When the electric motor 11 is running, the links 15, 16 acting as fly weights are hurled by the centrifugal force from the resting position shown in Fig. 1 into the operated position shown in Fig. 2, whereby the thrust rod 12 is pushed outwardly thus producing the actuating impulse.

When the electric motor 11 is de-energized the rotary elements are slowed down and stopped by the sole effect of the friction in the bearings 18 and 19. In order to guarantee a sufficiently quick deceleration, the elements are so designed that the momentum of inertia is as small as possible and that the friction of the bearings is comparatively high. To this end, the hinges of the links 15 and 16 are constituted by simple bearings of hardened steel. Moreover, the anti-friction bearings 18, 19 have a much larger dimension than required for the transmission of the actuating impulse. Therefore, no auxiliary braking mechanism is required in order to ensure that, when the motor 11 is de-energized, the thrust rod 12 will return to its normal position shown in Fig. 1 with the required promptness.

From the foregoing description it will appear that the lag in response to a de-energization of the electric motor 11 which is of the constant speed type, is not controlled by any mechanical or electrical auxiliary braking operation but solely by proper coordination of the momentum and of the friction in the bearings. A minimum lag will be attained by reducing the weight of the centrifugal fly weights constituted by the links 15 and 16 to a minimum and by making the bearings 18 and 19 as large as possible. The elimination of anti-friction bearings in the hinges between the links 15 and 16 contributes to a reduction of the momentum. Should it be desired in any particular case to increase the lag between the de-energization of the motor 11 and the return of the thrust rod 12 to normal, that may be easily be done by increasing the weight of the links 15, 16.

Thus it will become apparent that the invention is based on the realization of the fallacy of the assumption entertained heretofore by those skilled in the art that an auxiliary braking either by mechanical or electrical means is indispensable. By the elimination of auxiliary braking means the present invention achieves a material simplification of the device and a reduction of the cost of manufacture combined with an increased reliability of operation.

The lubrication of the hinges of the rotating links is very difficult because of the effect of the centrifugal force. The improved hinges of hardened steel will stand up for an extremely extended period of operation with a minimum of lubrication, thus further contributing to a long life and to the reliability in operation.

It will be noted that neither the motor shaft nor any other shaft driven by the motor extends out of the unit comprised of casing 10 and motor 11. In this respect, my invention differs from centrifugal regulators in which the motor serves as a prime mover for some machinery and operation of the fly weights is merely incidental. In the present invention the motor serves the sole function of driving the fly weights to produce the actuating impulse.

While the invention has been described hereinabove with reference to a preferred embodiment of the invention, it is to be understood that the same is not limited to the details of such embodiment but is capable of numerous modifications within the scope of the appended claims.

What I claim is:

1. Actuating device for the operation of brakes, clutches, or the like, comprising a casing, a shaft journaled in one wall thereof, an actuating rod slidably mounted in the opposite wall thereof co-axial with said shaft and adapted to be connected to the part which is to be actuated, a member arranged between and aligned with said shaft and said rod and rotatably connected with the latter, an electric motor of a constant speed type mounted on said casing to drive said shaft and a centrifugal link mechanism carried by said shaft and linked to said member and adapted, when accelerated by said electric motor, to axially displace said member causing the latter to push said actuating rod in outward direction, the motor being free from any driving connection except that with said shaft.

2. Actuating device for the operation of brakes, clutches, or the like, comprising a casing, a shaft journaled in one wall thereof, an actuating rod slidably mounted in the opposite wall thereof co-axial with said shaft and adapted to be connected to the part which is to be actuated, a member arranged between and aligned with said shaft and said rod and rotatably connected with the latter, an electric motor mounted on said casing to drive said shaft and a centrifugal link mechanism carried by said shaft and linked to said member and adapted, when accelerated by said electric motor, to axially displace said member causing the latter to push said actuating rod in outward direction, anti-friction bearings for said shaft and said member being mounted on said casing and said actuating rod, at least one of said anti-friction bearings having a size larger than that required with respect to the thrust imparted to said actuating rod, the motor being free from any driving connection except that with said shaft.

3. Actuating device for the operation of brakes, clutches or the like, comprising an electric motor, a centrifugal link mechanism connected therewith for rotation thereby, an actuating rod adapted to be connected to the part which is to be actuated, said rod being connected with said link mechanism for lengthwise displacement thereby owing to the effect of centrifugal forces, anti-friction bearings supporting said electric motor and said link mechanism and connecting the latter with said actuating rod, the rotary elements of said electric motor and said link mechanism being free from any braking means, the motor being free from any driving connection except that with said shaft.

4. Actuating device for the operation of brakes, clutches or the like, comprising an electric motor, a centrifugal link mechanism connected therewith for rotation thereby, an actuating rod adapted to be connected to the part which is to be actuated, said rod being connected with said link mechanism for lengthwise displacement thereby owing to the effect of centrifugal forces, said link mechanism consisting of two co-axial elements mounted for rotation and relative axial displacement, and of a plurality of pairs of links hinged to one another and to said elements, the hinges of said links and said elements consisting of hardened steel, the motor being free from any driving connection except that with said shaft.

5. Actuating device for the operation of brakes, clutches or the like, comprising a casing, a shaft journaled in one wall thereof, an actuating rod slidably mounted in the opposite wall thereof co-axial with said shaft and adapted to be connected to the part which is to be actuated, an electric motor of the constant speed type mounted on said casing and adapted to drive said shaft, a member arranged between and aligned with said shaft and said rod, an anti-friction thrust bearing connecting said rod and said member and having a size larger than that required for the transmission of the thrust imparted to said rod, a plurality of pairs of links hinged to one another and to said shaft and to said member to be movable in substantially radial planes and adapted upon rotation under the effect of centrifugal forces to axially displace said member and said rod, the hinges of said links consisting of hardened steel, the rotary elements of said electric motor, said shaft, said member and said links being free from any braking means, the motor being free from any driving connection except that with said shaft.

6. An actuating device for the operation of brakes, clutches and the like comprising an axially slidable rod adapted to be connected at one end to the part which is to be actuated, a rotary shaft aligned axially with said rod and spaced axially therefrom, an axially slidable member interposed between the rod and shaft and axially aligned with both and rotatably connected to said rod against axial movement relative thereto, and a centrifugally-operated link mechanism for moving said member axially on rotation of said shaft comprising a pair of links, each of which is hingedly connected at one end to said shaft, and a second pair of links, each of which is hingedly connected at one end to said member, and each of which is pivotally connected at its opposite end to one of the first-named pair of links, the points of pivotal connection of the second pair of links with the first pair of links being located radially between said rod and the points of hinged connection of the first pair of links with said shaft when the device is at rest.

HEINRICH LANGE.

REFERENCES CITED

The following references are of record in the file of this patent:

UNITED STATES PATENTS

| Number | Name | Date |
| --- | --- | --- |
| 1,840,482 | Wottring | Jan. 12, 1932 |
| 2,226,188 | Wittel | Dec. 24, 1940 |
| 2,438,545 | Davidson | Mar. 30, 1948 |
| 2,476,584 | Clark | July 19, 1949 |

FOREIGN PATENTS

| Number | Country | Date |
| --- | --- | --- |
| 141,918 | Germany | Feb. 25, 1902 |
| 578,249 | France | Sept. 20, 1924 |